United States Patent
Seong et al.

(10) Patent No.: US 10,193,200 B2
(45) Date of Patent: Jan. 29, 2019

(54) BATTERY MODULE AND BATTERY PACK COMPRISING SAME

(71) Applicant: LG CHEM, LTD., Seoul (KR)

(72) Inventors: Jun-Yeob Seong, Daejeon (KR);
Young-Sop Eom, Daejeon (KR);
Ki-Youn Kim, Daejeon (KR);
Sung-Chun Yu, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 25 days.

(21) Appl. No.: 15/117,380

(22) PCT Filed: Feb. 6, 2015

(86) PCT No.: PCT/KR2015/001258
§ 371 (c)(1),
(2) Date: Aug. 8, 2016

(87) PCT Pub. No.: WO2015/122657
PCT Pub. Date: Aug. 20, 2015

(65) Prior Publication Data
US 2016/0351979 A1    Dec. 1, 2016

(30) Foreign Application Priority Data

Feb. 17, 2014    (KR) .......................... 10-2014-0018028

(51) Int. Cl.
*H01M 10/6557* (2014.01)
*H01M 10/613* (2014.01)
(Continued)

(52) U.S. Cl.
CPC ..... *H01M 10/6557* (2015.04); *H01M 2/1061* (2013.01); *H01M 2/1077* (2013.01);
(Continued)

(58) Field of Classification Search
None
See application file for complete search history.

(56) References Cited

U.S. PATENT DOCUMENTS 8,685,556 B2    4/2014  Minokawa
2012/0214034 A1*  8/2012  Minokawa .......... H01M 2/1077
                                                429/83
(Continued)

FOREIGN PATENT DOCUMENTS

EP    2 565 960 A1    3/2013
JP    2012-84639 A    4/2012
(Continued)

OTHER PUBLICATIONS

Machine Translation of JP2012084639 to Hosoya published Apr. 2012.*
(Continued)

*Primary Examiner* — Wyatt P McConnell
(74) *Attorney, Agent, or Firm* — Birch, Stewart, Kolasch & Birch, LLP

(57) ABSTRACT

Disclosed is a battery module, which includes a cell assembly including a plurality of secondary batteries and having a fluid path formed between the secondary batteries; an inlet duct located at one side surface of the cell assembly so as to cover the one side surface of the cell assembly, and having an inlet port such that the fluid introduced through the inlet port flows into the fluid path; an outlet duct located at the other side surface of the cell assembly so as to cover the other side surface of the cell assembly, and having an outlet port such that the fluid discharged from the fluid path flows out through the outlet port; and an entrance cover installed to at least one of the inlet port and the outlet port, and having a plurality of ribs formed in a plate shape and slantly arranged so that an inner and outer direction of the ribs is inclined with a predetermined angle from a direction parallel (Continued)

to the ground, wherein at least one of inner and outer ends of at least one of the plurality of ribs is bent.

12 Claims, 7 Drawing Sheets

(51) Int. Cl.
*H01M 2/10* (2006.01)
*H01M 10/647* (2014.01)
*H01M 10/6556* (2014.01)
*H01M 10/6561* (2014.01)
*H01M 10/625* (2014.01)
*H01M 10/6563* (2014.01)
*H01M 10/6566* (2014.01)

(52) U.S. Cl.
CPC ....... *H01M 10/613* (2015.04); *H01M 10/625* (2015.04); *H01M 10/647* (2015.04); *H01M 10/6556* (2015.04); *H01M 10/6561* (2015.04); *H01M 10/6563* (2015.04); *H01M 10/6566* (2015.04)

(56) References Cited

U.S. PATENT DOCUMENTS

| | | |
|---|---|---|
| 2013/0130073 A1 | 5/2013 | Kim et al. |
| 2013/0323551 A1 | 12/2013 | Lee et al. |
| 2014/0315057 A1 | 10/2014 | Lee et al. |

FOREIGN PATENT DOCUMENTS

| | | |
|---|---|---|
| JP | 2012-174524 A | 9/2012 |
| KR | 10-2012-0016353 A | 2/2012 |
| KR | 10-2012-0076752 A | 7/2012 |
| KR | 10-2012-0120663 A | 11/2012 |
| KR | 10-2013-0053790 A | 5/2013 |
| KR | 10-2013-0056530 A | 5/2013 |
| KR | 10-1362180 B1 | 2/2014 |

OTHER PUBLICATIONS

International Search Report for PCT/KR2015/001258 dated May 13, 2015.

* cited by examiner

BATTERY MODULE AND BATTERY PACK COMPRISING SAME

TECHNICAL FIELD

The present application claims priority to Korean Patent Application No. 10-2014-0018028 filed on Feb. 17, 2014 in the Republic of Korea, the disclosures of which are incorporated herein by reference.

The present disclosure relates to a battery module, and more particularly, to a battery module capable of preventing penetration of impurities such as moisture and dust while enhancing cooling efficiency, and a battery pack including the battery module.

BACKGROUND ART

Recently, the demand for portable electronic products such as notebooks, video cameras, cellular phones or the like has rapidly increased, and electric vehicles, energy storage batteries, robots, satellites have been actively developed. For this reason, high-performance secondary batteries allowing repeated charging and discharging are being actively studied.

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

Recently, secondary batteries are widely used not only for small-sized devices such as cellular phones but also middle-sized or large-sized devices such as vehicles and power storages. When being used for such middle-sized or large-sized devices, a great number of secondary batteries are electrically connected to enhance capacity and output. In particular, for such middle-sized or large-sized devices, pouch-type secondary batteries are frequently used since they may be easily accommodated and stacked. A battery module may mean a component in which a plurality of secondary batteries is connected in series or in parallel to enhance capacity and output as described above.

When configuring such a battery module, one of main issues is cooling. A secondary battery may generate heat by itself while repeating charging and discharging, and since a plurality of secondary batteries is concentrated in a narrow space of a battery module, the temperature of the battery module may greatly rise while the battery module is in use.

Further, since middle-sized or large-sized devices such as vehicles and power storage devices are frequently used outdoors, the temperature of the battery module mounted thereto may more greatly rise under a high-temperature situation, for example in summer. However, if the temperature rises over a suitable level, the secondary battery included in the battery module may exhibit deteriorated performance and, in severe cases, may be fired or exploded. Therefore, it is a very important issue to ensure cooling performance when configuring a battery module.

A cooling method of a battery module is representatively classified into two types: air cooling and water cooling, and the air cooling type is widely used in comparison to the water cooling type due to electric short and waterproofing of a secondary battery. For the air cooling method, in many cases, a duct is provided to introduce fluid, for example an external air, into a battery module and discharge an air in the battery module to the outside.

In the configuration of such an existing battery module, air flows in or out through inlet and outlet ports of a duct, and in this process, external impurities such as dust and moisture may penetrate through the inlet and outlet ports of the duct. In this case, impurities such as moisture and dust may become a cause of deteriorating or breaking the battery module, and may also block a coolant path in the battery module to deteriorate cooling efficiency. Moreover, an electrically conductive substance such as bolt and wire piece may penetrate into the battery module through the inlet and outlet ports of the duct as an impurity, and in this case, such an electrically conductive substance may contact an electrode tab or a terminal to cause a short circuit in the battery module, which may break the battery module or cause fire or explosion.

To solve this problem, in an existing technique, a distance between the inlet and outlet ports of the duct is reduced, or a wire mesh or filter is installed at the inlet and outlet ports. However, such structures may disturb the flow or air through the inlet and outlet ports of the duct, which may cause a sufficient amount of air not to flow in and out through the duct, thereby seriously deteriorating the cooling performance of the battery module.

DISCLOSURE

Technical Problem

The present disclosure is designed to solve the problems of the related art, and therefore the present disclosure is directed to providing a battery module adopting an air cooling method, which has an improved air flowing structure capable of preventing external impurities from easily penetrating through inlet and outlet ports of a duct without deteriorating cooling efficiency, and a battery pack and a vehicle including the battery module.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Technical Solution

In one aspect of the present disclosure, there is provided a battery module, comprising: a cell assembly including a plurality of secondary batteries and having a fluid path formed between the secondary batteries; an inlet duct located at one side surface of the cell assembly so as to cover the one side surface of the cell assembly, and having an inlet port such that the fluid introduced through the inlet port flows into the fluid path; an outlet duct located at the other side surface of the cell assembly so as to cover the other side surface of the cell assembly, and having an outlet port such that the fluid discharged from the fluid path flows out through the outlet port; and an entrance cover installed to at least one of the inlet port and the outlet port, and having a plurality of ribs formed in a plate shape and slantly arranged so that an inner and outer direction of the ribs is inclined with a predetermined angle from a direction parallel to the ground, wherein at least one of inner and outer ends of at least one of the plurality of ribs is bent.

Preferably, the rib may be inclined so that a middle portion thereof other than the bent portion is gradually lowered in an outward direction.

Also preferably, at least one of the inner and outer ends of the rib may be bent in a direction perpendicular to the ground.

Also preferably, the inner and outer ends of the rib may be bent in opposite directions.

Also preferably, the inner end of the rib may be bent in an upward direction, and the outer end thereof may be bent in a downward direction.

Also preferably, the plurality of ribs may be arranged to be stacked in a vertical direction to be spaced apart from each other by a predetermined distance.

Also preferably, the rib may be configured so that an end portion of the inner end of the rib is located higher than an end portion of an outer end of an adjacent rib located thereabove.

Also preferably, at least one of the inlet duct and the outlet duct may have a fan.

In another aspect of the present disclosure, there is also provided a battery pack, which comprises the battery module according to the present disclosure.

In another aspect of the present disclosure, there is also provided a vehicle, which comprises the battery module according to the present disclosure.

Advantageous Effects

According to the present disclosure, since a fluid flowing structure through inlet and outlet ports of a battery module is improved, cooling efficiency is improved, and it is possible to effectively prevent impurities from penetrating into the battery module.

In particular, in an embodiment of the present disclosure, since it is not needed to narrow a gap of the inlet and outlet ports serving as a fluid passage between the inside and outside of the battery module, namely an interval between ribs, sufficient fluid movement through the gap of the inlet and outlet ports is ensured. Therefore, according to this feature of the present disclosure, cooling efficiency of the battery module may be improved.

In addition, in an embodiment of the present disclosure, since the possibility for external impurities such as moisture and dust to penetrate through the inlet and outlet ports is lowered, it is possible to prevent the battery module from having deteriorated cooling efficiency or performance or being broken due to such impurities. In particular, in an embodiment of the present disclosure, since it is effectively prevented that an electrically conductive substance such as bolt and wire piece penetrates through the inlet and outlet ports, it is possible to prevent such a substance from causing short, fire or explosion.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
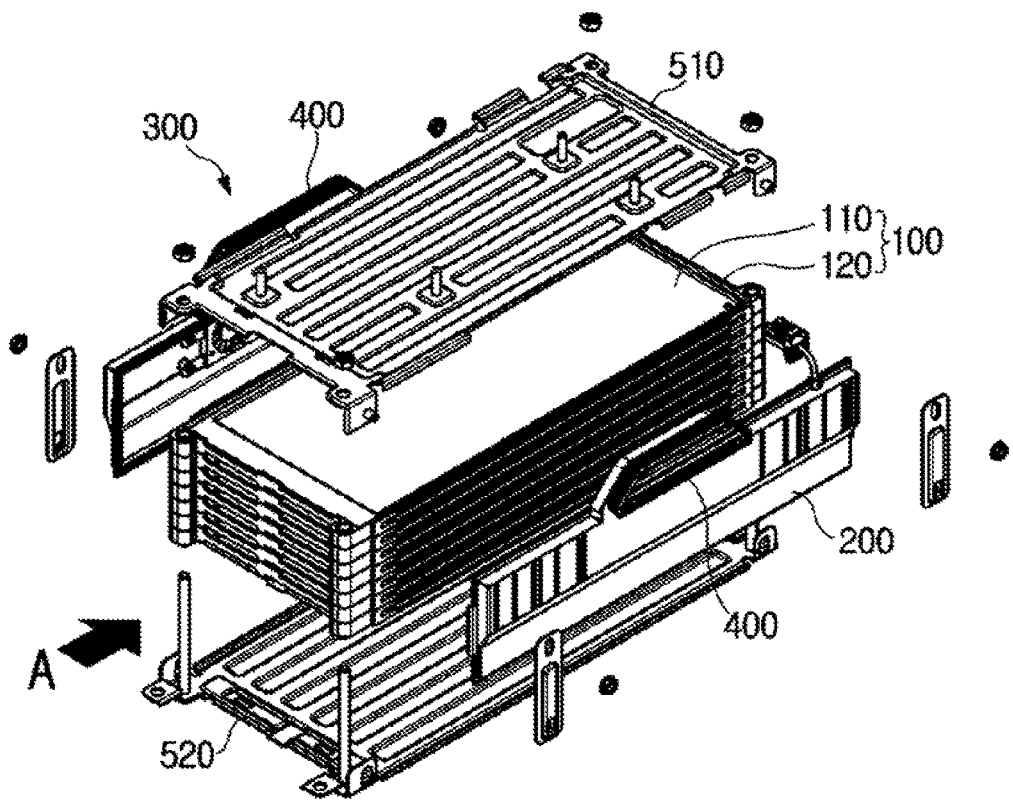
FIG. 1 is an exploded perspective view schematically showing a battery module according to an embodiment of the present disclosure.
Figure 2:
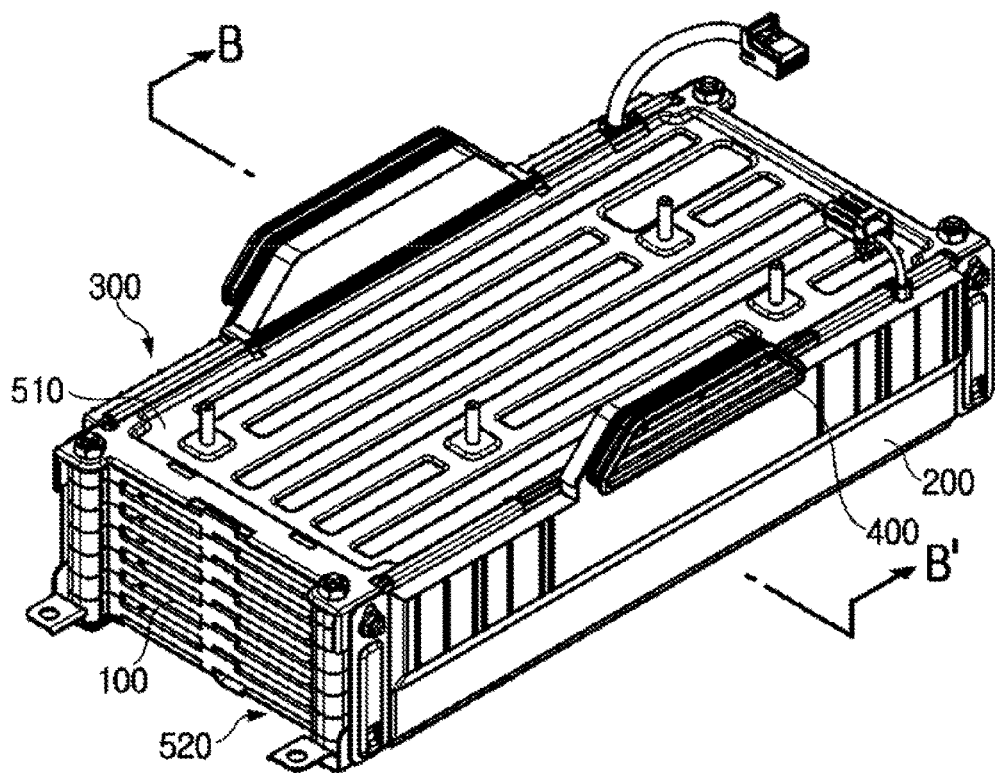
FIG. 2 is an assembled perspective view of FIG. 1.

FIG. 1 is an exploded perspective view schematically showing a battery module according to an embodiment of the present disclosure, and FIG. 2 is an assembled perspective view of FIG. 1.

Referring to FIGS. 1 and 2, a battery module according to the present disclosure includes a cell assembly 100, an inlet duct 200, an outlet duct 300 and an entrance cover 400.

The cell assembly 100 includes at least one secondary battery 110. In particular, in the battery module, the cell assembly 100 may be an assembly of secondary batteries, which includes a plurality of secondary batteries 110. Here, the secondary batteries 110 included in the cell assembly 100 may be pouch-type secondary batteries. In this case, the pouch-type secondary batteries may be stacked in one direction, for example in a vertical direction as shown in the figures.

Meanwhile, the cell assembly 100 may include a stacking frame 120 for stacking pouch-type secondary batteries. Here, the stacking frame 120 is a component used for stacking the secondary batteries 110, which may hold the secondary batteries 110 not to move, and the stacking frame 120 may be stacked on another stacking frame to guide assembling of the secondary batteries 110.

The stacking frame 120 may also be called with various names such as a cartridge, and may have a rectangular ring shape with a hollow center. In this case, four edges of the stacking frame 120 may be located at an outer circumference of the secondary battery 110.

In addition, the cell assembly 100 may be configured in a state where the secondary batteries 110 are stacked, and at least two secondary batteries 110 may be spaced apart from each other by a predetermined distance. In addition, by means of such a spaced configuration, a fluid path may be formed between the secondary batteries 110. In other words, the cell assembly 100 may be configured so that a fluid path is formed between the secondary batteries 110, and this may be implemented by the stacking frame 120. Therefore, if fluid, for example air, is introduced into the cell assembly 100 from the outside, the air may exchange heat with the secondary batteries 110 while flowing along the fluid path formed between the secondary batteries 110. At this time, the heat be exchanged between the secondary battery 110 and the air as the secondary battery 110 directly contacts the air. In other case, the stacking frame 120 may have a cooling fin adjacent to the secondary battery 110, and the cooling fin may contact the air so that the secondary battery 110 exchanges heat with the air indirectly.

Meanwhile, even though FIG. 1 shows that the secondary batteries 110 are stacked in a vertical direction in the cell assembly 100, the secondary batteries 110 may be stacked in various ways, for example in a horizontal direction.

The inlet duct 200 may be located at one side surface of the cell assembly 100 to cover the corresponding side surface of the cell assembly 100. For example, in FIG. 1, when front, rear, right and left directions of the cell assembly 100 are classified based on the case where the battery module is observed in the direction of an arrow A (this is applied likewise in the followings), the inlet duct 200 may be located at a right side surface of the cell assembly 100 among four side surfaces, to cover the right side surface. At this time, the inlet duct 200 may be shaped and sized corresponding to the right side surface of the cell assembly 100 to cover the right side surface of the cell assembly 100.

The outlet duct 300 may be located at the other side surface of the cell assembly 100 to cover the other side surface of the cell assembly 100. In particular, the outlet duct 300 may be located at a side surface of the cell assembly 100, which is opposite to the side surface where the inlet duct 200 is located, among four side surfaces thereof. For example, the outlet duct 300 may be located at a left side surface of the cell assembly 100 to cover the left side surface. At this time, the outlet duct 300 may be shaped and sized corresponding to the left side surface of the cell assembly 100 to cover the left side surface of the cell assembly 100.

Figure 3:
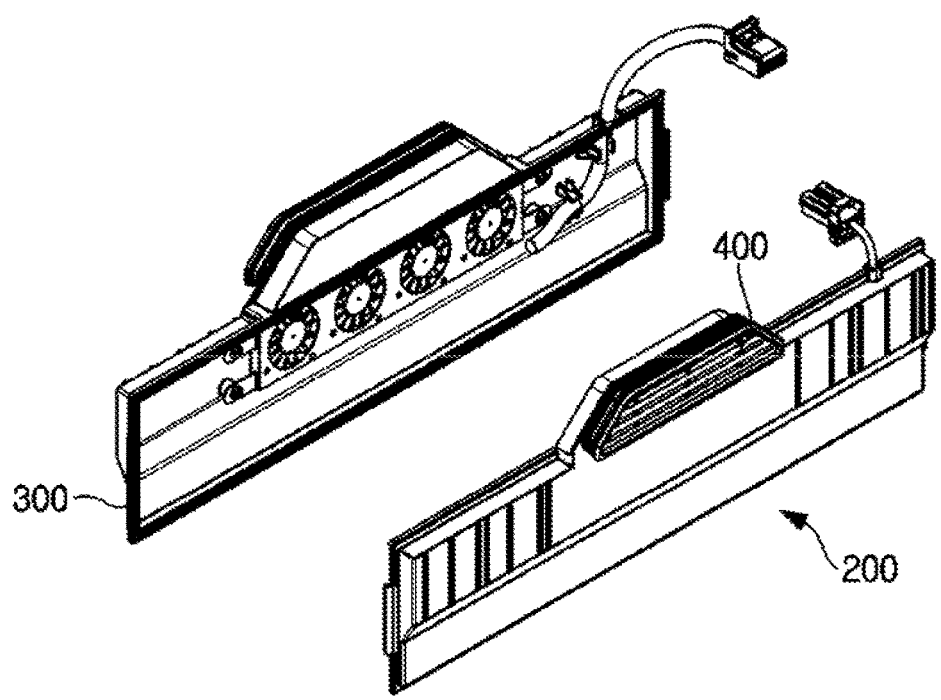
FIG. 3 is a perspective view showing only an inlet duct and an outlet duct, in the configuration of FIGS. 1 and 2.

FIG. 3 is a perspective view showing only the inlet duct 200 and the outlet duct 300, in the configuration of FIGS. 1 and 2. Also, FIG. 4 is an exploded perspective view showing that the entrance cover 400 is separated from the inlet duct 200 and the outlet duct 300, in the configuration of FIG. 3.

Figure 4:
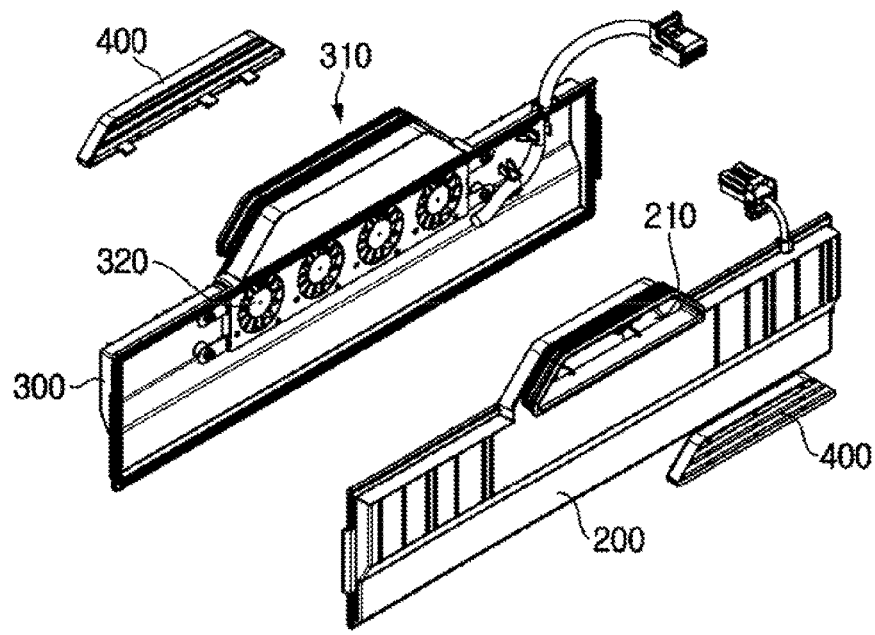
FIG. 4 is an exploded perspective view showing that an entrance cover is separated from the inlet duct and the outlet duct, in the configuration of FIG. 3.

Referring to FIGS. 3 and 4, the inlet duct 200 and the outlet duct 300 may respectively have an inlet port 210 and an outlet port 310 formed at least one side thereof, so that fluid may flow in or out through the inlet port 210 and the outlet port 310.

For example, the inlet port 210 is formed in at least one side of the inlet duct 200 so that fluid out of the battery module may flow into the battery module through the inlet port 210. In particular, the inlet duct 200 may be configured so that the fluid introduced through the inlet port 210 flows to the fluid path of the cell assembly 100.

In addition, the outlet port 310 is formed in at least one side of the outlet duct 300 so that fluid in the battery module flows out of the battery module through the outlet port 310. In particular, the outlet duct 300 may be configured so that the fluid introduced to the fluid path of the cell assembly 100 through the inlet duct 200 and flowing therein is discharged from the fluid path and flows out of the battery module through the outlet port 310.

The flow of fluid passing through the inlet duct 200, the cell assembly 100 and the outlet duct 300 as above will be described below in detail with reference to FIG. 5.

Figure 5:
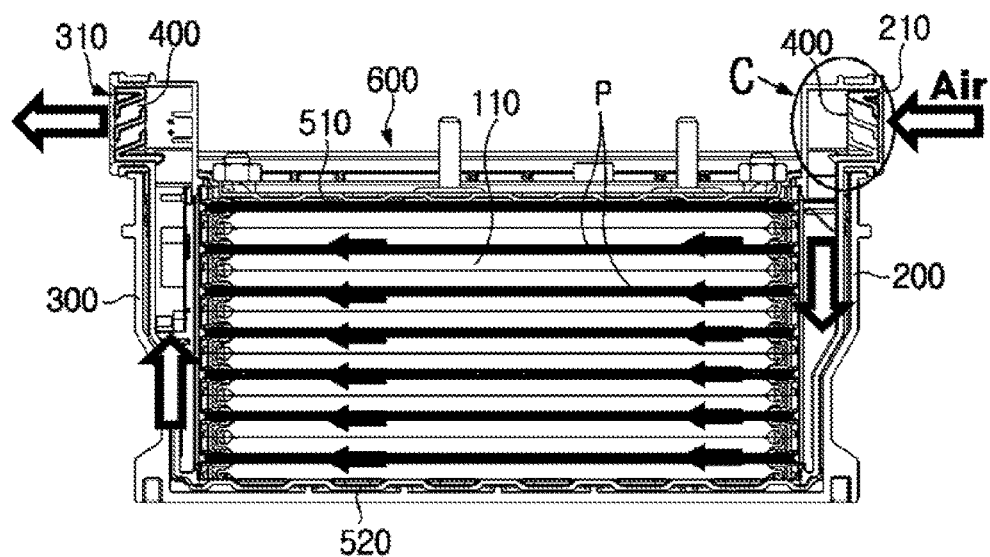
FIG. 5 is a cross-sectional view, taken along the line B-B' of FIG. 2.

FIG. 5 is a cross-sectional view, taken along the line B-B' of FIG. 2. However, in FIG. 5, in addition to the configuration of FIG. 2, a case 600 having an inner space for accommodating the battery module therein is depicted together. In addition, in FIG. 5, for convenience, a flow direction of fluid is depicted with arrows.

Referring to FIG. 5, the inlet duct 200 is provided at a right side of the cell assembly 100, and may have a right portion at which only an upper end is partially opened to form the inlet port 210 and a left portion at which a portion of covering the cell assembly 100, ranging from an upper end to a lower end thereof, is entirely opened to face the cell assembly 100. In this case, the fluid out of the battery module may flow in through the inlet port 210 in a left direction from a right side of the inlet duct 200, and the introduced fluid moves toward the cell assembly 100 located at a left side of the inlet duct 200. At this time, the right side of the inlet duct 200 is partially opened at its upper end as the inlet port 210, but the left side of the inlet duct 200 is entirely opened, so that the fluid introduced through the inlet port 210 may move in a downward direction as indicated by the arrow inside the inlet duct 200, and by doing so, the fluid may flow into the entire cell assembly 100 from its upper portion to its lower portion.

In particular, the cell assembly 100 may have a fluid path between the secondary batteries 110, as indicated by P, and a plurality of fluid paths P may be arranged in a vertical direction. Therefore, the fluid supplied from the inlet duct 200 to the cell assembly 100 may exchange heat with adjacent secondary batteries 110 while flowing through several fluid paths P, as shown in FIG. 5.

The outlet duct 300 is provided at a left side of the cell assembly 100, and may have a right portion facing the cell assembly 100, at which a portion covering the cell assembly 100, ranging from an upper end to a lower end thereof, is entirely opened and a left portion which is at least partially opened as the outlet port 310. In this case, the fluid flowing through several fluid paths of the cell assembly 100 may be discharged from the fluid path and move to the outlet duct 300, and the fluid moving to the outlet duct 300 may be discharged out through the outlet port 310 of the outlet duct 300. At this time, if the outlet port 310 is formed at an upper end of the outlet duct 300, as shown in FIG. 5, inside the outlet duct 300, the fluid may flow in an upward direction. In addition, the fluid flowing in an upward direction inside the outlet duct 300 as described above may be discharged out of the battery module through the outlet port 310 formed at the upper end of the outlet duct 300.

Meanwhile, since the entirely opened portions of the inlet duct 200 and the outlet duct 300 come into contact with the cell assembly 100, fluid may flow in or out between the cell assemblies 100. At this time, the inlet duct 200 and/or the outlet duct 300 may have a sealing member at a portion which contacts the cell assembly 100. For example, in the configuration of FIG. 5, the inlet duct 200 may be configured so that its outer circumference at the left open portion comes into contact with the cell assembly 100, and at this time, the sealing member may be provided to the left open portion to prevent the fluid from being leaked out in the space between the inlet duct 200 and the cell assembly 100.

The entrance cover 400 may be installed to at least one of the inlet port 210 of the inlet duct 200 and the outlet port 310 of the outlet duct 300. The entrance cover 400 may control flow direction, speed, amount or the like of the fluid passing through the inlet port 210 and the outlet port 310. For example, as shown in FIG. 5, the fluid may flow into the battery module through the inlet port 210, and by providing the entrance cover 400 to the inlet port 210, the flow direction, speed, amount or the like of the fluid passing through the inlet port 210 may be controlled. In addition, as shown in FIG. 5, the fluid may flow out of the battery module through the outlet port 310, and by providing the entrance cover 400 to the outlet port 310, the flow direction, speed, amount or the like of the fluid passing through the outlet port 310 may be controlled.

The configuration of the entrance cover 400 will be described in more detail with reference to FIGS. 6 to 9.

Figure 6:
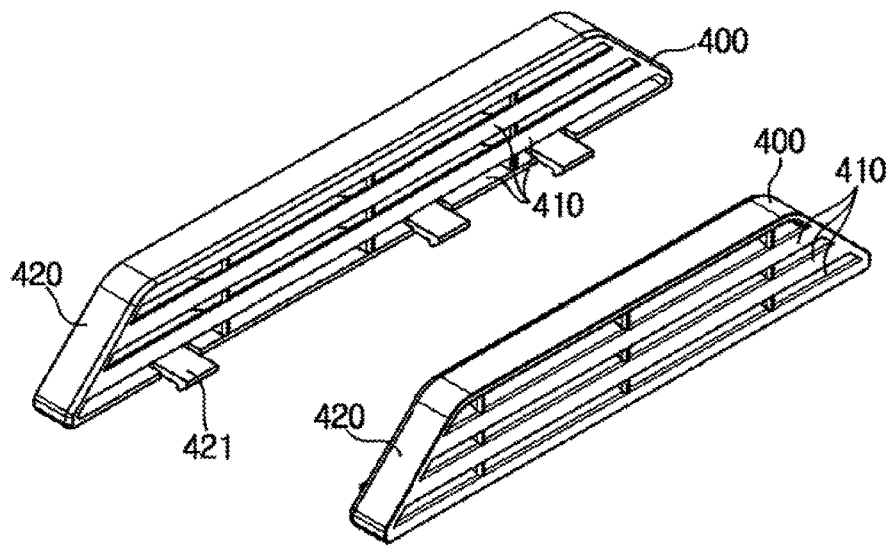
FIG. 6 is an enlarged view showing only the entrance cover 400, in the configuration of FIG. 4.
Figure 7:
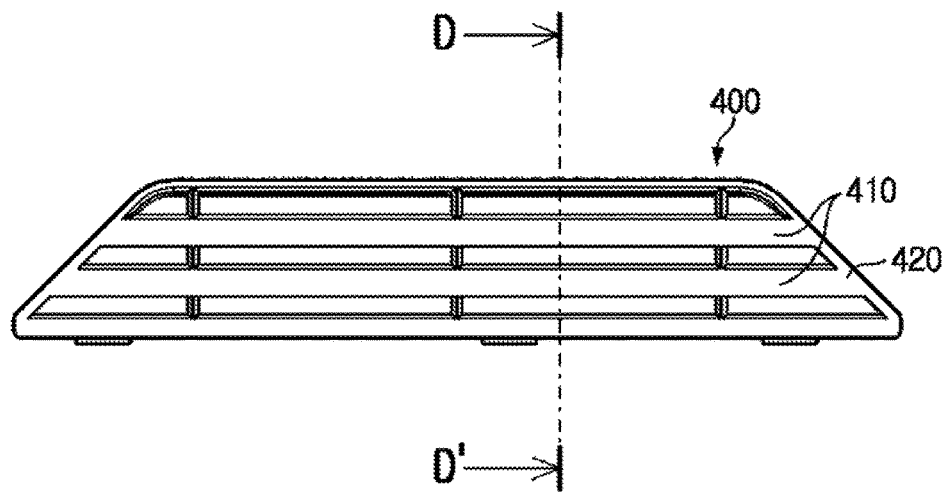
FIG. 7 is a right side view showing a right entrance cover 400, depicted in FIG. 6.
Figure 8:
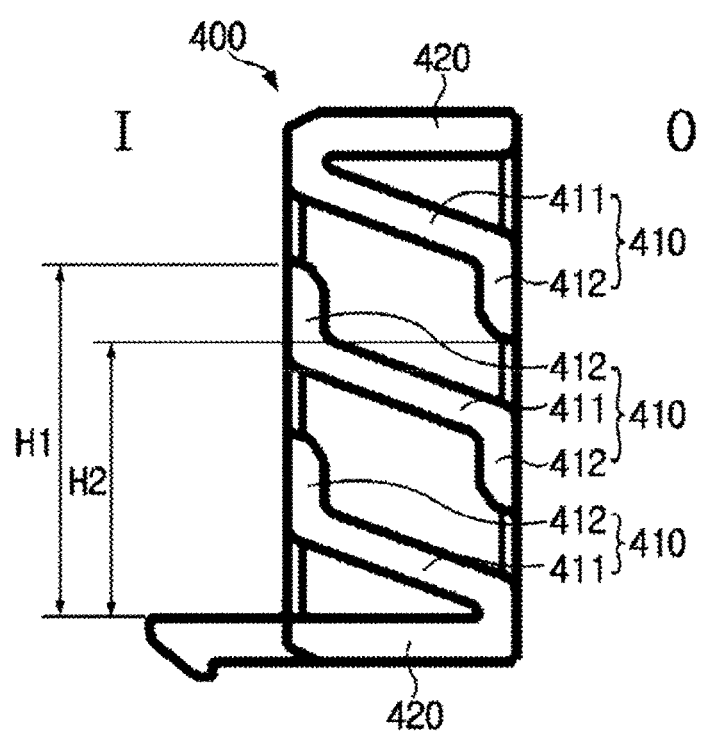
FIG. 8 is a cross-sectional view, taken along the line D-D' of FIG. 7.
Figure 9:
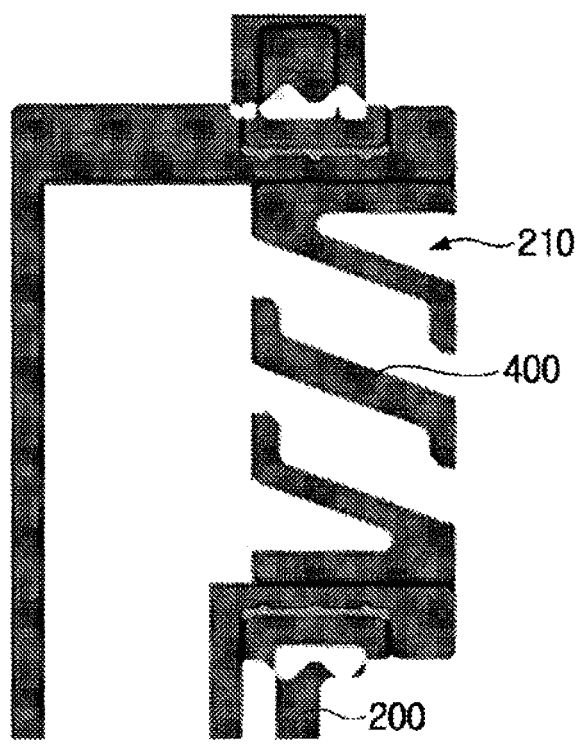
FIG. 9 is an enlarged view schematically showing a portion C of FIG. 5.

FIG. 6 is an enlarged view showing only the entrance cover 400, in the configuration of FIG. 4. Also, FIG. 7 is a right side view showing a right entrance cover 400, depicted in FIG. 6, and FIG. 8 is a cross-sectional view, taken along the line D-D' of FIG. 7. In addition, FIG. 9 is an enlarged view schematically showing a portion C of FIG. 5.

Referring to FIGS. 6 to 9, the entrance cover 400 may include a plurality of ribs 410.

Here, each rib 410 may be configured with a flat plate shape. In other words, the rib 410 may have a plate shape which is flat in a right and left direction of FIG. 7 and a right and left direction of FIG. 8 and has a small thickness in a vertical direction of FIGS. 7 and 8. In addition, a plurality of ribs 410 are provided at the entrance cover 400 and arranged to be spaced apart from each other by a predetermined distance. Since the rib 410 is configured with a plate shape, the fluid passing through a space between the ribs 410 may flow along the surface of the rib 410.

The rib 410 may be configured to extend in one direction. For example, the rib 410 may be elongated in a right and left direction of FIG. 7 and has a shorter length in a right and left direction of FIG. 8.

In particular, in the present disclosure, at least one of the plurality of ribs 410 may be configured so that the surfaces of its inner and outer sides are inclined with a predetermined angle from a direction parallel to the ground. Here, the inner side means an inner side of the battery module, namely a side where the cell assembly 100 is located, and the outer side means an outer side of the battery module. For example, in the configuration of FIG. 9, the inner side of the rib 410 may represent a left side of the rib 410, and the outer side of the rib 410 may represent a right side of the rib 410. Therefore, the inner and outer direction of the rib 410 may mean a right and left direction of the rib 410 in FIGS. 8 and 9, and the inner and outer surfaces of the rib 410 may mean an upper surface or a lower surface of the rib 410 depicted in FIGS. 8 and 9.

In more detail, in the configuration of FIGS. 8 and 9, three ribs 410 are provided at the entrance cover 400, and each rib 410 is inclined to be gradually lowered in a right direction from a left side thereof. In this configuration of the present disclosure, due to the inclined rib 410, the fluid passing through the entrance cover 400 also has a flow direction inclined along the slope of the rib 410. For example, if fluid is introduced at a right side in FIG. 8, the fluid moves to a left side while passing through the entrance cover 400, and due to the slope of the rib 410 gradually rising in a left direction, the fluid may flow in a left upward direction from a right lower portion.

In addition, in the present disclosure, at least one of the plurality of ribs 410 may be configured so that at least one of its inner and outer ends is bent.

For example, referring to FIG. 8, the rib 410 may have an inclined middle portion so that both ends of the middle portion are bent.

As described above, the rib 410 may have bent end portions and an inclined middle portion, and to classify them, the bent portion may be called a bent portion 412, and the inclined middle portion may be called an inclined portion 411. In this case, the rib 410 may be regarded as including an inclined portion 411 whose inner and outer direction is inclined with a predetermined angle from a direction parallel to the ground, and a bent portion 412 formed by bending at least one of the inner end and the outer end of the inclined portion 411.

In this configuration of the present disclosure, the fluid passing through the entrance cover 400 flows in an inclined pattern along the slope angle of the inclined portion 411, but its flow direction may be restricted or changed by the bent portion 412. In particular, in this configuration of the present disclosure, penetration of external impurities may be more effectively blocked by the bent portion 412.

For example, if the bent portion 412 is formed at the outer end of the rib 410, the outer bent portion 412 may prevent impurities such as moisture, dust or parts from penetrating into the entrance cover 400 from the outside of the entrance cover 400. In addition, if the bent portion 412 is formed at the inner end of the rib 410, the inner bent portion 412 may prevent impurities such as moisture, dust or parts penetrating into the entrance cover 400 from flowing into the inlet duct 200 or the outlet duct 300 at which the entrance cover 400 is installed, thereby preventing such impurities from entering the cell assembly 100 via the inlet duct 200 or the outlet duct 300.

Preferably, the rib 410 may be inclined so that a middle portion other than the bent portion 412 is lowered in an outward direction from an inner side.

For example, in the configuration of FIG. 8, the left portion of the entrance cover 400, indicated by I, may be an inner side portion toward the cell assembly 100, and the right portion of the entrance cover 400, indicated by O, may be an outer side portion toward the outside of the battery module. At this time, in the rib 410, the middle portion other than the bent portion 412, namely the inclined portion 411, may be configured to be gradually lowered in a right (outer) direction from a left (inner) side.

In this configuration of the present disclosure, when fluid flows into the entrance cover 400 in an outward direction, namely in a right direction in FIG. 8, it is possible to reduce introduced impurities. For example, impurities or various parts such as bolt and wire may be present out of a device to which the battery module is mounted, and such impurities or parts may be deviated from their original locations and move toward the inlet port 210 of the battery module. However, in the above configuration of the present disclosure, the inclined portion 411 of the rib of the entrance cover 400 is gradually lowered in an outward direction from an inner side, namely gradually rising in an inward direction from an outer side. Therefore, impurities or parts out of the battery module should go upstream along the inclined portion 411 of the rib in order to enter the battery module through the entrance cover 400, but this situation may not occur easily due to gravity. In particular, it is much harder for heavier impurities or parts to move upwards along the inclined portion 411 of the rib, and thus such impurities or parts may not easily enter the battery module. Moreover, moisture or dust having larger particles have a greater mass than the air and thus do not easily move in an upward direction along the inclined portion 411 of the rib, and thus it is possible to effectively prevent impurities from flowing into the battery module.

As described above, in the present disclosure, since the rib 410 is inclined to gradually rise in an inward direction from an outer side, the penetration of impurities may be effectively prevented, and thus it is not needed to narrow a gap between the ribs 410 in order to prevent the penetration of impurities. Therefore, in this embodiment of the present disclosure, a sufficient interval may be ensured between the ribs 410, and thus a sufficient amount of fluid may pass through the space between the ribs 410, thereby solving the problem that cooling efficiency is deteriorated due to an impurity-blocking structure.

Also preferably, at least one of the inner and outer ends of the rib 410 may be bent in a direction perpendicular to the ground.

For example, as shown in FIGS. 8 and 9, the inner and outer ends of the rib 410 may be bent in an upward direction or in a downward direction. In other words, the bent portion 412 of the rib may be configured to erect perpendicularly to the ground.

In this configuration of the present disclosure, the impurity-blocking effect by the bent portion 412 of the rib may be more improved. For example, if the bent portion 412 is bent in a downward direction, the vertical portion may be extended to a lowest location, in comparison to other cases. In addition, if the bent portion 412 is bent in an upward direction, the vertical portion may be extended to a highest location, in comparison to other cases. Therefore, if the bent portion 412 of the rib is formed perpendicular to the ground, the blocking height may be raised with the same length, and thus the effect of blocking impurities introduced from the outside may be improved.

More preferably, the inner and outer ends of the rib 410 may be bent in opposite directions.

In this configuration of the present disclosure, the impurity-blocking efficiency may be enhanced by the bent portion 412 of the rib, and also it is possible to prevent that the flow of fluid is disturbed due to a narrowed space, by means of the bent portion 412 of the rib.

In particular, the rib 410 may be configured so that its inner end is bent in an upward direction and its outer end is bent in a downward direction.

For example, in the embodiment of FIG. 8, among three ribs 410, a rib 410 located at the center may be configured so that its inner (left) end is bent in an upward direction and its outer (right) end is bent in a downward direction. In addition, a rib 410 located at an uppermost portion may be configured so that only its outer end is bent in a downward direction. In addition, a rib 410 located at a lower portion may be configured so that only its inner end is bent in an upward direction.

In this configuration of the present disclosure, the impurity-blocking efficiency by the bent portion 412 may be enhanced, and the cooling efficiency may be stably ensured. In other words, in the present disclosure, the inclined portion 411 of the rib may be configured to be gradually lowered from its inner end to an outer end. Here, if the bent portion 412 is formed in a downward direction at the inner end of the inclined portion 411 and the bent portion 412 is formed in an upward direction at the outer end of the inclined portion 411, the fluid path between the ribs 410 may be seriously blocked due to the outer bent portion 412. In addition, since the inner bent portion 412 is formed in a downward direction, impurities moving along the inclined portion 411 may not be properly blocked but easily flow toward the cell assembly 100. However, if the inner bent portion 412 is bent in an upward direction as in this embodiment, even though impurities moves inwards along the inclined portion 411 of the rib, this movement is restricted by the inner bent portion 412, and thus the impurities may not flow toward the cell assembly 100. Therefore, if the inclined portion 411 of the rib is slantly formed to be gradually lowered from an inner side to an outer side, it is desirable that the outer bent portion 412 located at the outer end of the rib 410 is bent in a downward direction and also the inner bent portion 412 located at the inner end of the rib 410 is bent in an upward direction.

Also preferably, the plurality of ribs 410 may be spaced apart from each other by a predetermined distance, so that fluid may flow in the space between the ribs 410. At this time, as shown in several figures, the plurality of ribs 410 may be arranged to be stacked in a vertical direction.

In particular, in the embodiment of the present disclosure, since the inclined portion 411 of the rib may be inclined with a predetermined angle in an inner and outer direction and the bent portion 412 of the rib may be bent in a vertical direction, in order to block penetration of impurities and ensure cooling performance by the configuration of the ribs 410, the plurality of ribs 410 may be arranged to be stacked in a vertical direction.

At this time, an end portion of the inner end of the rib 410 may be located higher than an end portion of an outer end of an adjacent rib 410 located thereabove.

For example, in the configuration of FIG. 8, among three ribs 410, assuming that a height of the end portion of an inner (left) bent portion 412 of a rib 410 located at a middle layer is H1 and a height of the end portion of an outer (right) bent portion 412 of a rib 410 located at an uppermost layer is H2, the ribs 410 may be configured to satisfy H1>H2.

In this configuration of the present disclosure, since an inner bent portion 412 of a rib 410 stacked at a lower position is higher than an outer bent portion 412 of a rib 410 located at an upper position just above the former rib, there may be no exposure between the inside and the outside of the entrance cover 400 in a horizontal direction (in a right and left direction of FIG. 8). In other words, in this configuration, when impurities move in a horizontal direction, the impurities are not able to pass in a direction from the outside of the entrance cover 400 to the inside thereof, and thus the impurity-blocking efficiency by the entrance cover 400 may be further enhanced.

As described above, in the present disclosure, due to the inclined portion 411 of the rib and the bent portion 412 of the rib, impurities may be effectively blocked, and since it is not needed to excessively narrow the gap between the ribs 410, the cooling performance may be stably ensured.

Meanwhile, the entrance cover 400 may include a rim portion 420 in addition to the plurality of ribs 410 so that the plurality of ribs 410 are respectively fixed thereto and also the entrance cover 400 may be attached to an inner surface of the inlet port 210 or the outlet port 310. Therefore, the rim portion 420 of the entrance cover 400 may be shaped corresponding to the inlet port 210 or the outlet port 310. For example, if the inlet port 210 and the outlet port 310 have a trapezoidal shape, the rim portion 420 of the entrance cover 400 may also have a trapezoidal shape as shown in FIG. 7.

Here, the rim portion 420 of the entrance cover 400 may have a component for coupling to the inlet duct 200 or the outlet duct 300. For example, as shown in FIG. 6, the coupling unit may have a protrusion 421, and the protrusion 421 may be coupled in a way of being hooked to a certain portion of the inlet port 210 of the inlet duct 200 or the outlet port 310 of the outlet duct 300.

However, it is not essential that the entrance cover 400 has the rim portion 420, and the entrance cover 400 may also be configured without the rim portion 420. In this case, both ends of each rib 410 in a length direction (both ends in a right and left direction of FIG. 7) may be directly coupled and fixed to the inner surface of the inlet port 210 or the outlet port 310.

Meanwhile, the entrance cover 400 may be formed integrally with the inlet duct 200 or the outlet duct 300. In other words, the entrance cover 400 may be configured as a portion of the inlet duct 200 or the outlet duct 300, without being assembled to or dissembled from the inlet duct 200 or the outlet duct 300. In this case, the ribs 410 of the entrance cover 400 may be configured with the same material as the inlet duct 200 or the outlet duct 300.

Preferably, the inlet duct 200 and the outlet duct 300 may include a fan 320 provided to at least one side thereof so that fluid introduced through the inlet port 210 may be more easily transferred to the fluid path of the cell assembly 100 and the fluid discharged from the fluid path may more easily flow out through the outlet port 310.

Meanwhile, the battery module according to the present disclosure may further include an upper plate 510 and a lower plate 520, as shown in FIGS. 1 and 2.

The upper plate 510 and the lower plate 520 may have a plate shape with a large area and may be located at upper and lower portions of the cell assembly 100, respectively, to cover the upper and lower portions of the cell assembly 100. The upper plate 510 and the lower plate 520 may give a mechanical supporting force with respect to the battery module and play a role of protecting the cell assembly 100 against external impacts at the upper and lower portions of the cell assembly 100. For this, the upper plate 510 and the lower plate 520 may be made of metal material to ensure rigidity.

The cell assembly 100 may be interposed between the upper plate 510 and the lower plate 520 and may be fixed between the upper plate 510 and the lower plate 520. For this, the upper plate 510 and the lower plate 520 may have a configuration for coupling with the cell assembly 100. For example, as shown in FIGS. 1 and 2, insert holes may be formed at four edges of the cell assembly 100 in a vertical direction, and in this case, the lower plate 520 has insert rods at corresponding locations, so that each insert rod of the lower plate 520 is inserted into the corresponding insert hole of the cell assembly 100 to fix the cell assembly 100 to the lower plate 520. In addition, holes may be formed in the upper plate 510 so that the insert rods of the lower plate 520 are inserted therethrough and then secured thereto using nuts.

A battery pack according to the present disclosure includes at least one battery module as described above. At this time, in addition to the battery module, the battery pack may further include a case for accommodating the battery module, and various devices for controlling charge/discharge of the battery module such as a Battery Management System (BMS), a current sensor, a fuse or the like.

The battery module according to the present disclosure may be applied to a vehicle such as an electric vehicle and a hybrid electric vehicle. In other words, a vehicle according to the present disclosure may include the battery module according to the present disclosure.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or a shape in which an object is placed.

What is claimed is:
1. A battery module, comprising:
a cell assembly including a plurality of secondary batteries and having a fluid path formed between the secondary batteries, the cell assembly having a bottom surface, an upper surface, and side surfaces extending between the bottom surface and the upper surface;
an inlet duct located at one side surface of the cell assembly so as to cover the one side surface of the cell assembly, and having an inlet port such that the fluid introduced through the inlet port flows into the fluid path;
an outlet duct located at another side surface of the cell assembly so as to cover the another side surface of the cell assembly, and having an outlet port such that the fluid discharged from the fluid path flows out through the outlet port; and
an entrance cover installed to at least one of the inlet port and the outlet port, and having a plurality of ribs formed in a plate shape and slantly arranged relative to the bottom surface of the cell assembly so that the ribs are inclined with a predetermined angle from a direction parallel to the bottom surface of the cell assembly, the plurality of ribs extending from one side of an opening in the entrance cover to another side of the opening in the entrance cover,
wherein at least one of inner ends closest to the cell assembly and outer ends furthest from the cell assembly of at least one rib of the plurality of ribs is bent in a direction perpendicular to the bottom surface of the cell assembly, and
wherein the inner and outer ends of the rib are bent in opposite directions.
2. The battery module according to claim 1, wherein the at least one rib is inclined so that a middle portion thereof other than the bent portion is lowered as it extends away from the cell assembly.

3. The battery module according to claim 1,
wherein the inner end of the at least one rib is bent in an upward direction away from the bottom surface, and the outer end thereof is bent in a downward direction towards the bottom surface of the cell assembly.

4. The battery module according to claim 1,
wherein the plurality of ribs are arranged to be stacked in a vertical direction relative to the bottom surface of the cell assembly so as to be spaced apart from each other by a predetermined distance.

5. The battery module according to claim 4,
wherein the at least one rib is configured so that an end portion of the inner end of the at least one rib is located higher than an end portion of an outer end of an adjacent rib located thereabove relative to the bottom surface of the cell assembly.

6. The battery module according to claim 1,
wherein at least one of the inlet duct and the outlet duct has a fan.

7. A battery pack, comprising a battery module which is defined in claim 1.

8. A vehicle, comprising a battery module which is defined in claim 1.

9. The battery module according to claim 1, wherein a portion of the inlet port is higher than the upper surface of the cell assembly such that the portion of the inlet port does not overlap a portion of cell assembly when viewed normal to the one side surface.

10. The battery module according claim 9, wherein a portion of the outlet port is higher than the upper surface of the cell assembly such that the portion of the outlet port does not overlap a portion of cell assembly when viewed normal to the another side surface.

11. The battery module according to claim 1, wherein the entrance cover has a rim defining the opening.

12. The battery module according to claim 11, wherein the entrance cover includes a protrusion extending from the rim, the protrusion being configured to connect to said at least one of the inlet port and the outlet port.

* * * * *